Figure 2:
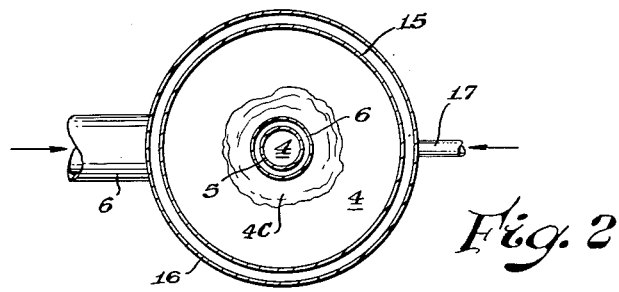

Oct. 17, 1961 J. L. AMOS ET AL 3,004,899
DEVOLATILIZING APPARATUS
Filed Jan. 9, 1957

INVENTORS.
James L. Amos
Samuel G. Ludington
Wilson W. Hunt
BY Griswold & Burdick
ATTORNEYS

Patent 3,004,899 — Devolatilizing Apparatus

United States Patent Office

3,004,899
Patented Oct. 17, 1961

3,004,899
DEVOLATILIZING APPARATUS
James L. Amos, Samuel G. Ludington, and Wilson W. Hunt, Midland, Mich., assignors to The Dow Chemical Company, Midland, Mich., a corporation of Delaware
Filed Jan. 9, 1957, Ser. No. 633,316
3 Claims. (Cl. 202—191)

This invention relates to improved apparatus for devolatilizing polymeric compositions, particularly those comprised of such alkenyl aromatic polymer compounds as polystyrene, polyvinyltoluene and the like, to rid them of undesirable volatile constituents including monomers, low molecular weight polymers, and various gases that may be present.

The fugacious constituents of freshly prepared polymeric compositions are generally removed while the composition is in a molten or otherwise liquid condition and is being held in or passed through a devolatilizing chamber which allows the escaping volatiles to freely contact the hot, bare metal walls of the chamber. Such contact of the usually readily-decomposable volatile constituents may cause or permit considerable quantities of dark, solid, scale-like deposits to accumulate as an encrustation on the bare metal walls of the chamber. The polymeric compositions that are being devolatilized may frequently be seriously and intolerably contaminated with fallen specks or flakes of the generally carbonaceous deposits that have become dislodged so as to flake off during operation of the apparatus. The situation is particularly prevalent and vexatious when polystyrene and the like are being processed in and handled through the ordinarily employed devolatilizing appliances.

It would be a significant advantage to provide improved devolatilizing apparatus which, while being capable of satisfactorily efficient function, would have an abiding non-susceptibility to difficulties of the indicated type.

This may be readily achieved with improved devolatilizing apparatus that is in accordance with the present invention and which essentially comprises a devolatilizing chamber for a liquid polymeric composition that is to be devolatilized, said chamber being adapted to maintain said liquid polymeric composition at a substantially constant level relative to the wall of said chamber; a positively cooled overhead dome on said chamber for condensing at least a portion of the volatile constituents escaping from the polymeric composition being devolatilized in said chamber, said dome diverging outwardly and downwardly to enclose said chamber with the lowermost peripheral edge of the dome extending clear of and at least about as low as the upper peripheral edge of the chamber walls; means for collecting condensed volatiles from the lower peripheral portion of said dome; a central conduit for introducing the polymeric composition to be devolatilized into said chamber, said conduit terminating in vertical projection above the liquid level of the polymeric composition in said chamber and being adapted to discharge said polymeric composition in a cascading, fountain-like, enveloping flow downwardly about the exterior projecting portion of said conduit; and heating means for maintaining the walls of said chamber that are above the liquid level of said polymeric composition beneath a decomposing temperature for said volatile constituents. The coating flow of molten polymeric composition around and about the central, fountain-like inlet conduit and the non-condensing wall surface in the devolatilizing chamber, coupled with the purposive and positively-condensing overhead dome, substantially eliminates the possibility for decomposition of the escaping volatile constituents on hot, bare, metal walls. Thus, accumulation of troublesome, dislodgeable deposits and consequent contamination of the polymer is effectively avoided.

Figure 1:
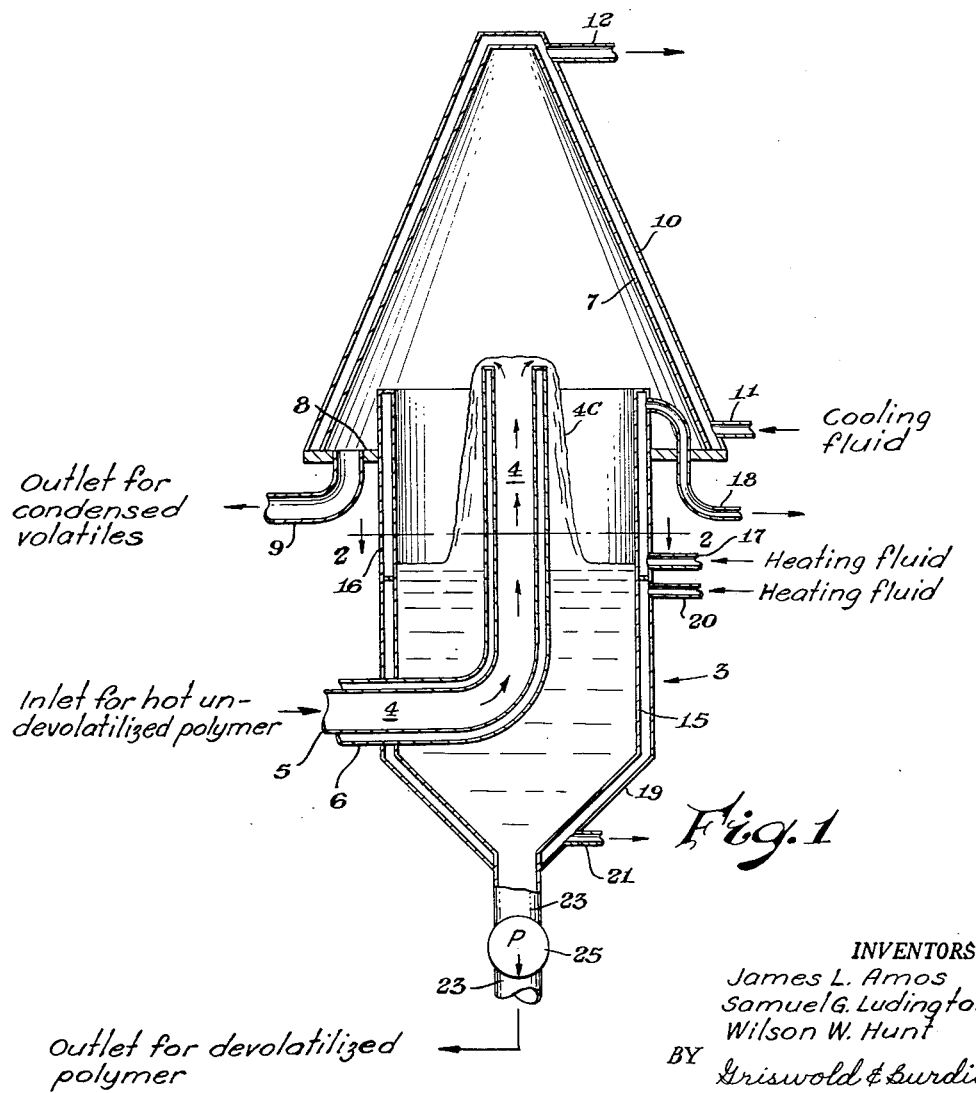

The accompanying drawing is schematically illustrative of a suitable embodiment of an improved devolatilizer that includes additional features and advantages according to the invention. In the drawing, the apparatus is shown in elevation (predominantly in section) in FIGURE 1 and in cross-section in FIGURE 2, as taken along the line 2—2 in FIGURE 1.

The devolatilizing apparatus, indicated generally by the reference numeral 3, may advantageously consist of a devolatilizing chamber body 15 enclosed by an overhead condensing dome 7 that diverges downwardly to extend lower than the walls of the chamber body 15 so as to enclose the chamber. The undevolatilized polymer composition, heated to an appropriate elevated temperature for its devolatilization (as from a heat-exchanging unit of suitable type not shown), is admitted to the apparatus through the inlet conduit 5, which beneficially may be provided with a heating jacket or insulation 6. The inlet conduit 5, which is illustrated as being side-entering, is arranged to project vertically in the devolatilizing apparatus above the liquid level 14 of the mass of polymer that is being devolatilized. The undevolatilized polymer being fed to the devolatilizing chamber flows out of the inlet conduit 5 and, in a fountain-like manner, flows in a cascading, coating envelopment (designated by the reference numeral 4C) downwardly about the exterior projecting portion of the polymer.

The overhead condensing dome 7 may advantageously, as depicted, be arranged in or with a downwardly funneled or flaring conical configuration although it may also be otherwise shaped, as with more arcuate architecture. A circumferential collecting trough 8, emptied through an outlet 9, is provided at the bottom of the periphery of the dome 7 to collect the condensed volatiles that run down the interior surface of the dome. The condensate outlet 9 may advantageously be in communication with a suitable vacuum source (not shown) and, if desired, a recovery system. Although, in certain instances, the dome 7 may be air cooled, it is usually preferable to utilize more positive cooling means for the condensation. To this end, the dome 7 may be provided with a jacket 10 for water or other suitable coolant that may be admitted to and withdrawn from the jacket through the inlet and outlet connections 11 and 12, respectively.

As has been indicated, all of the escaping volatiles need not be condensed upon the dome, although this may be accomplished if it is so desired. It is only necessary for the achievement of satisfactory results to condense enough of the volatiles on the dome to maintain its surface in a continuously wet (or sweating) condition, When the dome is operated so as to achieve only a partial condensation of the volatiles, subsequent recovery systems may, of course, be utilized. In connection with the operation of the dome, good results may also be obtained when it is maintained at such a low temperature that substantially all or a portion of the vapor space that it encompasses is, thermally speaking, at or below the dew point of the escaping volatiles.

The devolatilizing chamber body 15 may also be jacketed with advantage in order to separately heat its upper and lower portions (separated at about the liquid level 14 of the polymer) in the most expedient manner for optimum performance. Thus, a heating jacket 16, having inlet and outlet connections 17 and 18 respectively, is provided about the walls of the devolatilizing chamber body 15 above the liquid level of the polymeric composition to maintain the upper walls at a temperature that is beneath the decomposition temperature of the volatiles that are escaping from the devolatilizing composition. While, in some cases, it may be desired to operate the upper portion of the chamber wall at a greater than condensing temperature for the volatiles, it is not essential to do so. In other instances, condensing temperatures may be an advantage to secure a wet, liquid washing action on the exposed surface. Any solidified polymer that may build up thereon exerts little, if any, impediment to the desired devolatilization. Polymer build-up may actually afford excellent protection of the wall. Any suitable heat-exchanging fluid may be circulated through the jacket 16 for this purpose. The lower portion of the body is maintained, in an analogous manner, at a temperature that is adapted to secure a flowing condition in the polymeric composition being devolatilized. A high temperature heating jacket 19, having an inlet 20 and outlet 21, is provided for this reason about the lower portion of the chamber from and extends down from about the liquid level 14 of the polymer. The devolatilized polymeric composition is transferred from the bottom of the chamber body 15, by means of a pump or other forwarding device 25, through an outlet 23 to an extruder (not shown) or other desired subsequent handling means.

As is apparent, the volatile constituents that are escaping as vapors from the polymeric composition condense upon and are collected from the dome without being permitted to contact any portion of the bare metal in the apparatus under conditions that might be conducive to their decomposition and consequent deposit formation. It is usually desirable, incidentally, to fabricate the apparatus with aluminum or a corrosion-resisting variety of steel.

Apparatus in accordance with the invention have been successfully used for as long as six months to devolatilize a partially polymerized polystyrene composition, containing about 70 percent by weight of polymer solids, without forming objectionable deposits anywhere in the devolatilizing chamber. In the operation, the undevolatilized polymer was admitted at about 225° C., the dome was water-cooled and maintained at about 65° C., the jacketed wall above the polymer level heated at about 150° C., the jacketed wall below the polymer level heated at about 250° C., and an absolute pressure of about 150 millimeters of mercury effected and maintained in the apparatus. An excellent, substantially uncontaminated, uniform polystyrene product was consistently obtained. At the end of this period, all the inner surfaces were found to be bright and shiny, as installed. In contrast, a conventional devolatilizer operating with inner bare surface temperatures of about 200–220° C. that was employed to devolatilize molten polymer at 180–200° C. was found to quickly form heavy deposits over its entire exposed, hot inner surface. At the end of four months a complete heavy encrustation had developed in the conventional equipment.

Devolatilizing apparatus in accordance with the present invention may advantageously be utilized with many other varieties of polymer compositions. As is apparent, many changes and modifications can be entered into in the practice of the invention without substantially departing from its intended spirit and scope, as it is delineated in the hereto appended claims.

What is claimed is:

1. An improved devolatilizing apparatus for polymeric compositions which comprises a devolatilizing chamber for a liquid polymeric composition that is to be devolatilized, said chamber being adapted to maintain said liquid polymeric composition at a substantially constant level relative to the walls of said chamber; a positively cooled overhead dome on said chamber for condensing volatile constituents escaping from the polymeric composition being devolatilized in said chamber, said dome diverging outwardly and downwardly continuously from its top to bottom to enclose said chamber with the lowermost peripheral edge of the dome extending clear of and at least about as low as the upper peripheral edge of the chamber walls; means for collecting condensed volatiles from the lower peripheral portion of said dome; a central conduit for introducing the hot, undevolatilized polymeric composition into said chamber, said conduit terminating in vertical projection above the liquid level of the polymeric composition in said chamber and being adapted to discharge said hot polymeric composition in a cascading, fountain-like, enveloping flow downwardly about and in circumferential contact with the exterior projecting portion of said conduit; heating means for maintaining the walls of said chamber that are above the liquid level of said polymeric composition beneath a decomposing temperature for said volatile constituents; and heating means for maintaining the walls of said chamber that are below the liquid level of said polymeric composition at a flowing temperature for said polymeric composition.

2. The apparatus of claim 1, wherein the means for collecting condensed volatiles from said dome is an encircling trough formed at the lowermost peripheral edge of said dome.

3. The apparatus of claim 1, wherein said dome has a downwardly flaring, conical configuration.

References Cited in the file of this patent

UNITED STATES PATENTS

| 516,924 | Du Pont | Mar. 20, 1894 |
| 1,429,541 | Schnug | Sept. 19, 1922 |
| 1,939,224 | Pietzsch | Dec. 12, 1933 |
| 2,274,802 | Mills | Mar. 3, 1942 |
| 2,475,639 | Rainwater | July 12, 1949 |
| 2,530,409 | Stober et al. | Nov. 21, 1950 |
| 2,611,741 | Thompson | Sept. 23, 1952 |

FOREIGN PATENTS

| 51,890 | Norway | Dec. 27, 1932 |

OTHER REFERENCES

Webster's New International Dictionary, second edition, unabridged, G. and C. Merriam Co. Publisher, Springfield, Mass., 1938.